(12) United States Patent
Jacob et al.

(10) Patent No.: US 10,076,738 B2
(45) Date of Patent: Sep. 18, 2018

(54) FLUIDIZING DEVICE

(71) Applicant: Glatt Ingenieurtechnik GmbH, Weimar (DE)

(72) Inventors: Michael Jacob, Weimar (DE); Reinhard Boeber, Weimar (DE); Raoul Pila, Bad Bellingen (DE); Heinz Pritzke, Braunsdorf (DE)

(73) Assignee: Glatt Ingenieurtechnick GmbH, Weimar (DE)

( * ) Notice: Subject to any disclaimer, the term of this patent is extended or adjusted under 35 U.S.C. 154(b) by 196 days.

(21) Appl. No.: 14/781,965

(22) PCT Filed: Apr. 3, 2014

(86) PCT No.: PCT/DE2014/000163
§ 371 (c)(1),
(2) Date: Oct. 2, 2015

(87) PCT Pub. No.: WO2015/117577
PCT Pub. Date: Aug. 13, 2015

(65) Prior Publication Data
US 2016/0074827 A1    Mar. 17, 2016

(30) Foreign Application Priority Data

Apr. 3, 2013 (DE) .................. 10 2013 005 921

(51) Int. Cl.
*F26B 5/08* (2006.01)
*B01J 8/44* (2006.01)
(Continued)

(52) U.S. Cl.
CPC .................. *B01J 8/44* (2013.01); *B01F 3/06* (2013.01); *B01F 7/16* (2013.01); *B01J 8/36* (2013.01);
(Continued)

(58) Field of Classification Search
CPC ..... B01J 8/44; B01J 8/00; B01J 8/0015; B01J 8/08; B01J 8/18; B01J 8/1818;
(Continued)

(56) References Cited

U.S. PATENT DOCUMENTS 3,311,993 A * 4/1967 Terenzio Bersano ......................
B29B 13/021
34/187
3,724,090 A    4/1973 Smith, Jr.
(Continued)

FOREIGN PATENT DOCUMENTS

AT    220 075 B    3/1962
AT    252874 B     3/1967
(Continued)

OTHER PUBLICATIONS

Extended description of GB 1059077.*
(Continued)

*Primary Examiner* — John McCormack
(74) *Attorney, Agent, or Firm* — Collard & Roe, P.C.

(57) ABSTRACT

The invention starts out from a fluidizing apparatus (1) for conditioning solid particles, consisting of a distribution chamber (2), a turbulence chamber (3), wherein the turbulence chamber (3) has separating walls (10) or the like for conveying solid particles along a conveyor path, a solid particle inlet unit (6) as well as a solid particle outlet unit (7) and a flow receiving base (11), wherein an air distribution plate (18) is arranged below the flow receiving base (11), and opening ratios, which result through openings (22) in the air distribution plate (18), vary.

13 Claims, 9 Drawing Sheets

(51) Int. Cl.
  *B01J 8/36* (2006.01)
  *B01J 8/38* (2006.01)
  *B01F 3/06* (2006.01)
  *B01F 7/16* (2006.01)
  *F26B 5/00* (2006.01)

(52) U.S. Cl.
  CPC .............. *B01J 8/382* (2013.01); *F26B 5/00* (2013.01); *B01J 2208/0092* (2013.01); *B01J 2208/00884* (2013.01); *B01J 2208/00938* (2013.01)

(58) Field of Classification Search
  CPC . B01J 8/2222; B01J 8/2226; B01J 8/36; B01J 8/38; B01J 2208/00884; B01J 2208/0092; B01F 3/06; B01F 7/16; F26B 17/18; F26B 11/028
  USPC ................... 34/179, 323, 579, 587, 589
  See application file for complete search history.

(56) References Cited

U.S. PATENT DOCUMENTS

| | | | |
|---|---|---|---|
| 4,096,792 | A | 6/1978 | Smith, Jr. |
| 4,246,836 | A | 1/1981 | Smith, Jr. |
| 4,426,936 | A | 1/1984 | Kuo |
| 4,511,093 | A | 4/1985 | Ohkoshi et al. |
| 5,199,184 | A | 4/1993 | Rosse |
| 5,648,118 | A | 7/1997 | Liborius |
| 2003/0190417 | A1 | 10/2003 | Takei et al. |
| 2008/0203200 | A1 | 8/2008 | Waldron et al. |
| 2008/0299305 | A1 | 12/2008 | Bedetti |
| 2010/0095886 | A1 | 4/2010 | Bedetti |
| 2014/0283739 | A1 | 9/2014 | Bedetti |
| 2014/0310980 | A1* | 10/2014 | Jacob ................. B01J 2/16 34/589 |
| 2014/0318444 | A1 | 10/2014 | Bedetti |

FOREIGN PATENT DOCUMENTS

| | | | |
|---|---|---|---|
| AT | 331 189 B | 8/1976 | |
| DE | 1 227 840 B | 10/1966 | |
| DE | 29 04 077 A1 | 11/1979 | |
| DE | 30 02 610 A1 | 8/1980 | |
| DE | 236 159 A1 | 5/1986 | |
| DE | 35 19 750 C2 | 6/1988 | |
| DE | 29 04 121 C2 | 7/1988 | |
| DE | 197 06 434 A1 | 8/1998 | |
| DE | 20 2010 011 968 U1 | 12/2010 | |
| EP | 0 965 279 A2 | 12/1999 | |
| EP | 1 584 371 A1 | 10/2005 | |
| GB | 1 059 077 A | 2/1967 | |
| GB | 1072908 A * | 6/1967 | ............ B01J 8/26 |
| JP | H03-500501 A | 2/1991 | |
| JP | H03-284343 A | 12/1991 | |
| JP | H05-70639 U | 9/1993 | |
| JP | H07 265683 A | 10/1995 | |
| JP | H08 29057 A | 2/1996 | |
| JP | H08-29057 A | 2/1996 | |
| WO | 2006/067544 A1 | 6/2006 | |
| WO | 2007/124745 A1 | 11/2007 | |

OTHER PUBLICATIONS

Machine translation of JP H07265683.*
International Search Report of PCT/DE2014/000163, dated Sep. 5, 2014.
International Search Report of PCT/DE2014/000162, dated Feb. 2, 2015.

* cited by examiner

FLUIDIZING DEVICE

CROSS REFERENCE TO RELATED APPLICATIONS

This application is the National Stage of PCT/DE2014/000163 filed on Apr. 3, 2014, which claims priority under 35 U.S.C. § 119 of German Application No. 10 2013 005 921.6 filed on Apr. 3, 2013, the disclosure of which is incorporated by reference. The international application under PCT article 21(2) was not published in English.

PRIOR ART

The invention starts out from a fluidizing apparatus for continuously conditioning solid particles.

Continuously operated fluidizing apparatuses for conditioning solid particles comprising a turbulence chamber, which rotates about the vertical central axis and which is divided into processing chambers, have been prior art for a long time. A constant and exactly defined dwell time of the solid particles in the fluidizing apparatus is attained in particular by means of the turbulence chamber, which rotates about the vertical central axis.

Patent specification DE-PS 1 227 840 B introduces a continuously operating fluidized bed dryer for pourable goods. This fluidized bed dryer consists of a duct-like drying chamber, a sieve bottom, through which gaseous drying agent flows, and radial walls, which revolve about the duct axis above the sieve bottom in the drying chamber, comprising radial walls, which reach to the duct jacket above the height thereof. The duct jacket, which widens upwards, overlaps a stationary filter and loading chamber, which is connected to the duct on the top and an air chamber below the sieve bottom so as to form a seal in each case. The radial walls are hereby fixedly connected to the duct jacket. The disadvantage of this technical solution, which is disclosed in the patent specification, is on the one hand that the flow rate of the gas across the entire sieve bottom is the same, on the other hand that the outlet unit reduces the drying chamber, which is present for conditioning the solid particles, within the turbulence chamber.

Patent specification AT 252874 B describes a fluidized bed device for continuously carrying out chemical reactions and/or physical-chemical operations with a time-adjustable passage of the starting material, which is to be processed. For this purpose, each individual section of the fluidized bed chamber or of the reaction chamber, respectively includes a horizontal hollow shaft, which is provided with arms and openings, wherein a chamber for distributing the medium, which enters, which consists of a plurality of sections or segments, respectively, each individual section or each individual segment of which, respectively, is provided with a gas supply, in which a device for regulating and/or interrupting the supply of the reaction medium of the fluidized medium, if applicable, is provided, is arranged below the reaction of fluidized bed chamber, respectively. The disproportionately large structural effort for regulating the gas, which is required for generating the fluidized bed in the individual sections or segments, respectively, of the air chamber, is a large disadvantage hereby, because an additional structural effort is always associated with additional production costs.

THE INVENTION AND ITS ADVANTAGES

In contrast, the fluidizing apparatus according to the invention for conditioning solid particles has the advantage that an air distribution plate is arranged below the flow receiving base, wherein opening ratios, which result through openings in the air distribution plate, vary. According to the invention, the fluidizing apparatus consists of a distribution chamber, a turbulence chamber, wherein the turbulence chamber has separating walls or the like for conveying solid particles along a conveyor path, a solid particle inlet unit as well as a solid particle outlet unit and a flow receiving base. By installing an air distribution plate into the distribution below a flow receiving base of the turbulence chamber or of a rotary dryer star, respectively, a segmentation of the distribution chamber, which results in a significant additional structural effort, is no longer required for generating different conditioning conditions in the turbulence chamber. The production costs are thus lowered while simultaneously obtaining a field of application of the fluidizing apparatus, which is broader due to the increased flexibility.

According to an advantageous embodiment of the fluidizing apparatus according to the invention, the opening ratios of the air distribution plate change with an increasing conveyor path of the solid particles, which are to be conditioned, in the turbulence chamber. A segmentation of the distribution chamber is no longer required due to the change of the opening ratios on the air distribution plate, because the most diverse conditioning conditions can be set in the turbulence chamber due to the counter pressure, which is generated by means of the air distribution plate. A segmentation of the air distribution chamber can nonetheless be optional.

According to an additional advantageous embodiment of the fluidizing apparatus according to the invention, a variation of the opening ratios takes place on the air distribution plate as a function of the cross section of the openings. It is attained by means of the different opening ratios that the solid particles are fluidized optimally in the turbulence chamber at any time during the processing, for example with reference to the drying level thereof.

According to an additional advantageous embodiment of the fluidizing apparatus according to the invention, at least one processing chamber is located between the solid particle inlet unit and the solid particle outlet unit of the fluidizing apparatus, so that a backmixing with particles, which have already been conditioned, does not take place when adding the solid particles. Due to the fact that there is no backmixing with the solid particles, which have already been conditioned, the production quality of the solid particles, which are to be generated, is increased.

According to an additional advantageous embodiment of the fluidizing apparatus according to the invention, at least one non-perforated sector is arranged on the air distribution plate. It is prevented in this manner that the treatment gases disperse upwards without being used in the part of the circumferential rotary dryer star, which is not loaded with goods.

According to such an advantageous embodiment of the fluidizing apparatus according to the invention, the non-perforated sector has an opening angle. Ideally, the opening angle of the non-perforated sector corresponds to the opening angle of the processing chambers, whereby a backmixing of the solid particles, which are to be treated, is prevented.

According to an additional advantageous embodiment of the fluidizing apparatus according to the invention, a rotary dryer star is arranged in a rotatable manner in the turbulence chamber. By rotating the rotary dryer star, an exactly defined dwell time of the solid particles is set in the turbulence chamber.

According to such an advantageous embodiment of the fluidizing apparatus according to the invention, the processing chambers on the rotary dryer star are stretched by means of the separating walls. The division of the rotary dryer star into processing chambers has the advantage that the individual batches of the solid particles are strictly separated from one another and can thus be conditioned optimally, matched to the respective conditioning state.

According to such an advantageous embodiment of the fluidizing apparatus according to the invention, the processing chamber, which is stretched on the rotary dryer star, provides the dimensions of the other processing chambers. Due to the even division of the turbulence chamber into processing chambers, which are stretched on the rotary dryer star, a continuous operation mode of the fluidizing apparatus according to the invention is made possible. In addition, the processing chambers of equal size ensure that a backmixing does not take place when solid particles, which are to still be conditioned, and solid particles, which have already been conditioned, are added and that the production quality is thus increased.

According to an additional advantageous embodiment of the fluidizing apparatus according to the invention, the openings of the air distribution plate take over the function of a blower device in the area of the solid particle outlet unit for discharging the solid particles. By taking over the blow-out function, e.g. by means of a perforation, which points diagonally in discharge direction, a suction, e.g., which is operated at low pressure, can be omitted at the solid particle outlet unit, whereby the production costs are lowered.

According to an additional advantageous embodiment of the fluidizing apparatus according to the invention, the air distribution plate can be replaced. The replaceability of the air distribution plate ensures a high level of flexibility, so as to be able to also use a modularly constructed fluidizing apparatus for other processes and to hereby be able to set the ideal process conditions for the solid particles, which are then supplied.

According to an additional advantageous embodiment of the fluidizing apparatus according to the invention, the distribution chamber is embodied in a segmented manner. The use of a distribution chamber, which is embodied in a segmented manner, further increases the flexibility of the fluidizing apparatus according to the invention, because the fluidizing apparatus can also be operated without an air distribution plate, e.g. when performing repair work on the latter. In addition, different temperatures can also be made possible through this, which provide for the formation of a temperature course in response to a continuous operation mode.

According to an additional advantageous embodiment of the fluidizing apparatus according to the invention, the separating walls arranged on the rotary dryer star extend across the entire height of the turbulence chamber. A spilling of the solid particles into other processing chambers is thus prevented, whereby a backmixing of the solid particles also does not occur and the production quality is consistently high.

Further advantages and advantageous embodiments of the invention can be gathered from the description, the claims and the drawings below.

DRAWING

Preferred exemplary embodiments of the subject matter according to the invention are illustrated in the drawing and will be explained in more detail below.

DESCRIPTION OF THE EXEMPLARY EMBODIMENTS

Figure 1:
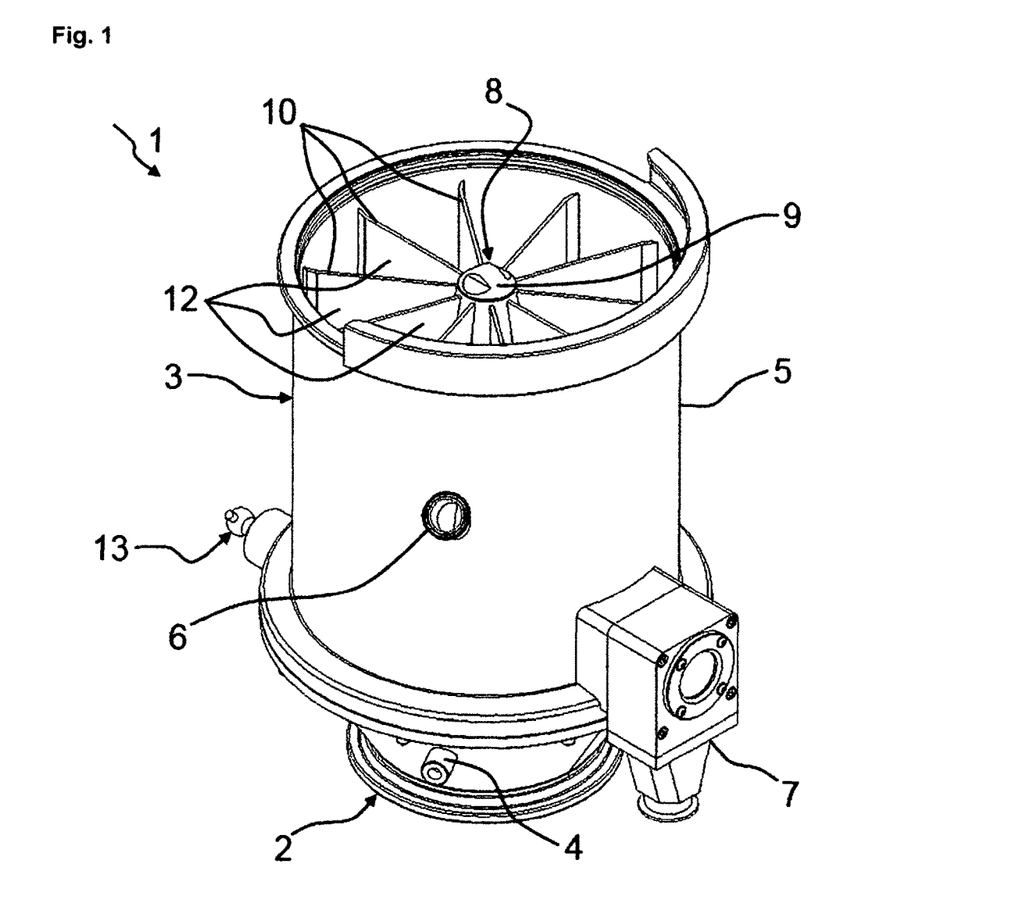
FIG. 1 shows a perspective illustration of a fluidizing apparatus according to the invention.

FIG. 1 shows an exemplary embodiment of the fluidizing apparatus 1 according to the invention in a perspective illustration. The illustrated fluidizing apparatus 1 consists of two modular functional units, a distribution chamber 2 and a turbulence chamber 3, which is arranged above the distribution chamber 2. A supply of the distribution chamber 2 with a gaseous drying agent, e.g. air, an inert gas or the like, which serves to embody a fluidized bed, is ensured via a feed line 4, for example a pipe connection or the like, which is arranged on the distribution chamber 2 in an appropriate manner. The turbulence chamber 3, which is arranged above the distribution chamber 2, consists of an outer jacket 5, which has a solid particle inlet unit 6 and a solid particle outlet unit 7, and a rotary dryer star 8, which rotates in the turbulence chamber 3 and which has a cone 9 as well as separating walls 10 arranged thereon, which are made of metal sheet, aluminum or the like, for example, and which divide the turbulence chamber 3 into segments, and a flow receiving base 11, which cannot be seen in the drawing. The separating walls 10, which extend across the complete construction height of the turbulence chamber 3, the outer jacket 5, the non-illustrated flow receiving base 11, for example a grating, a punched or perforated plate, of the rotary dryer star 8 as well as a non-illustrated cover of the turbulence chamber 3 form processing chambers 12. A rotation of the rotary dryer star 8, whereby an exactly defined dwell time of the solid particles is adjusted in the turbulence chamber 3, is generated by means of a drive unit 13, for example a servomotor or the like.

Figure 2:
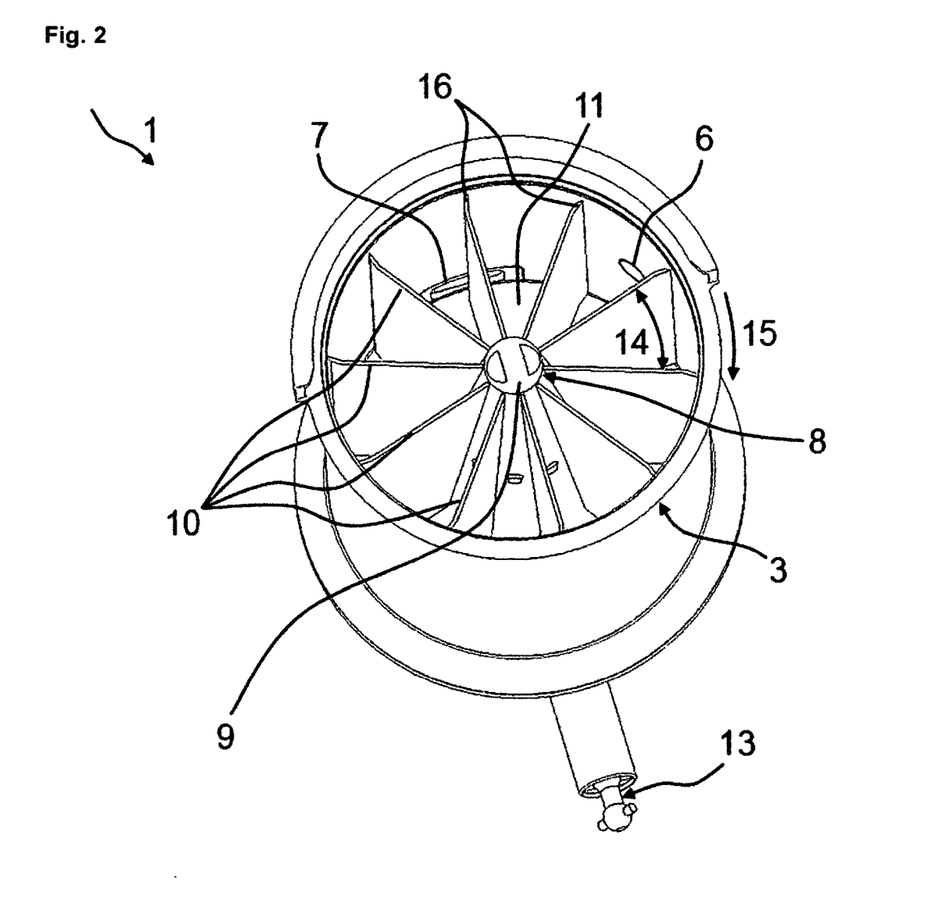
FIG. 2 shows a perspective illustration onto a fluidizing apparatus according to the invention.

A perspective illustration onto the fluidizing apparatus 1 according to the invention is illustrated in FIG. 2. The top view illustration shows the technical features of the fluidizing apparatus 1, which have already been mentioned in FIG. 1, as well as the flow receiving base 11, which is not shown in FIG. 1. In addition, an opening angle 14 of the processing chambers 12 is shown, which is largely determined by the positions of the solid particle inlet unit 6 and the solid particle outlet unit 7 relative to one another. As explained above, the processing chambers 12 are formed by the separating walls 10, which are arranged on the cone 9 of the rotary dryer star 8, the flow receiving base 11, the outer jacket 5 and the non-illustrated cover. The flow receiving base 11 can hereby be made as grate, as punched or as perforated plate, for example. The ideal opening angle of the processing chambers 12 results from the curve, which forms from the end of the solid particle outlet unit 7 to the beginning of the solid particle inlet unit 6. By offsetting the solid particle inlet unit 6 and the solid particle outlet unit 7 relative to one another, the uncoupling thereof is attained, whereby a backmixing of the solid particles, which have already been conditioned, and of the solid particles, which are newly conveyed via the solid particle unlet unit 6, is ensured in the continuous fluid bed process. In addition, the product quality is increased by means of this arrangement or by uncoupling the two units, respectively. The cone 9 of the rotary dryer star 8, the diameter of which increases from the non-illustrated cover in the direction of the flow receiving base 11, serves to calm the flow and thus a more stable fluid bed within the turbulence chamber 3. The separating walls 10 arranged on the rotary dryer star 8 extend across the entire height of the turbulence chamber 3 and are thus so high that a spilling of the fluidized solid particles is not possible during the operation of the fluidizing apparatus 1. This characteristic of the separating walls 10 increases the product quality, because a backmixing of differently conditioned solid particles is thus prevented between the individual processing chambers 12. On the outer end, the separating walls 10 in the exemplary embodiment furthermore have a separating wall closure 16, which is curved or angled, respectively, in the direction of rotation 15, whereby an additional mechanical stability of the separating walls 10 of the rotary dryer star 8 is attained on the one hand and whereby a sealing of the processing chambers 12 against the outer jacket 5 takes place on the other hand. Solid particles, which adhere to the inner wall of the outer jacket 5, are simultaneously scraped off by means of the separating wall closure 16, which is curved in the direction of rotation 15, and a contamination of the inner wall of the outer jacket 5 is thus prevented. The separating wall closure 16 between separating wall 10 and outer jacket 5 of the turbulence chamber 3 can also be generated by means of a seal, which is suitable in a different way. In addition to the possibility of using a rotating rotary dryer star 8, there is also the possibility to fixedly connect the outer jacket 5 to the separating walls 10 of the rotary dryer star 8 and to thus embody the complete turbulence chamber 3 in a rotatable manner.

Figure 3:
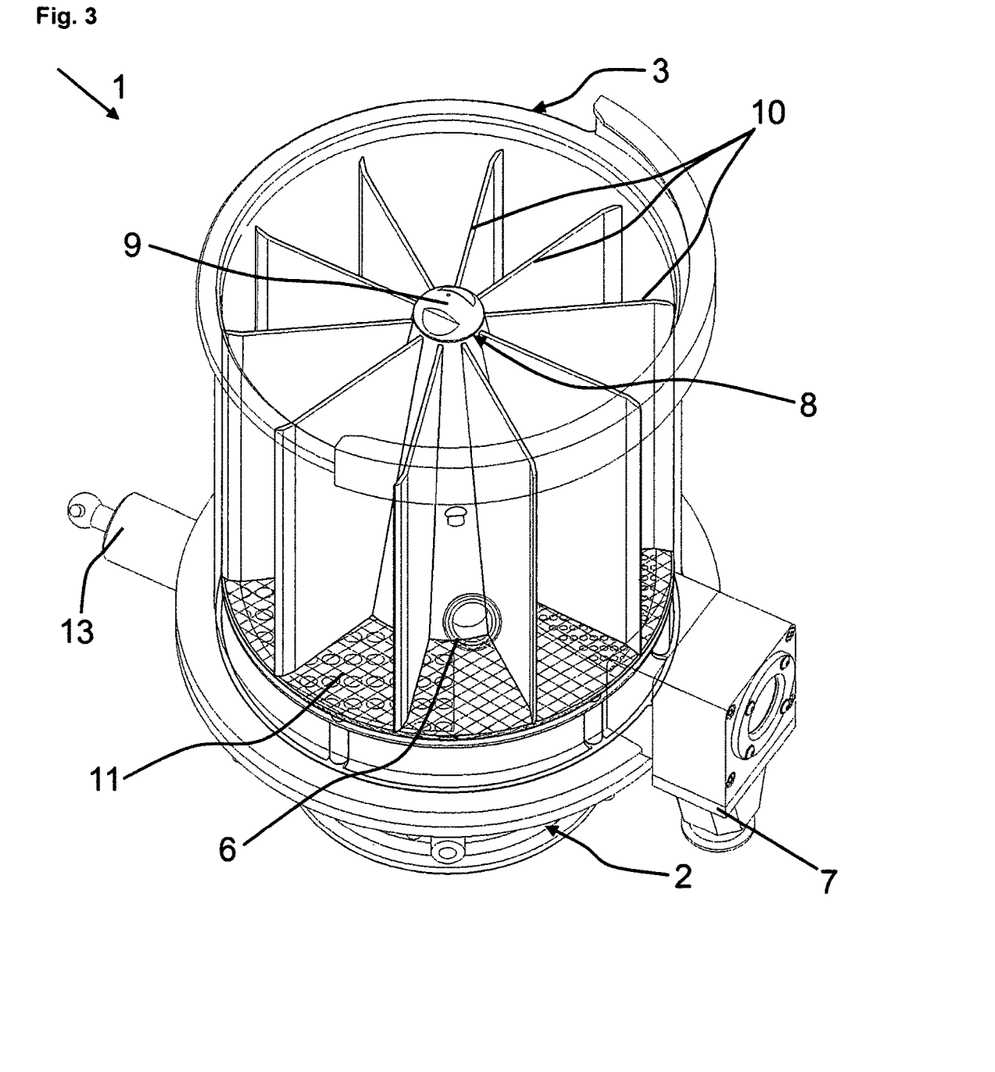
FIG. 3 shows a cut, perspective illustration of a fluidizing apparatus according to the invention.
Figure 7:
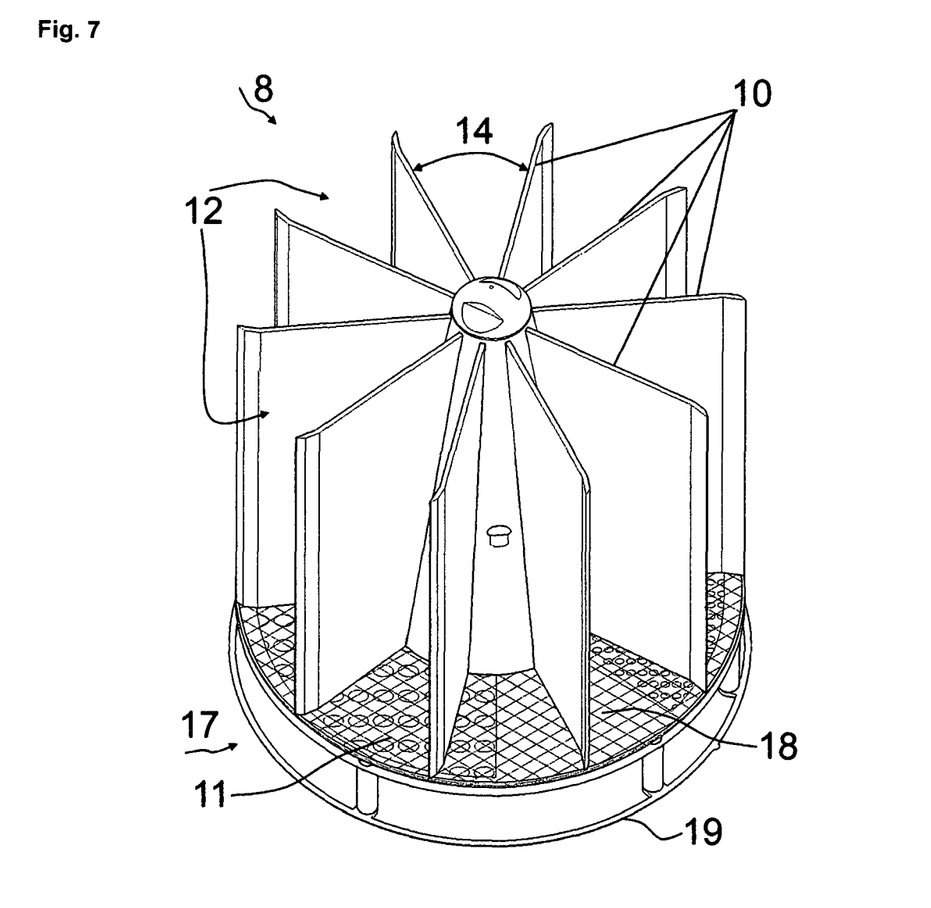
FIG. 7 shows a perspective illustration of an assembly of the rotary dryer star and of the mounting part of the distribution chamber.
Figure 8:
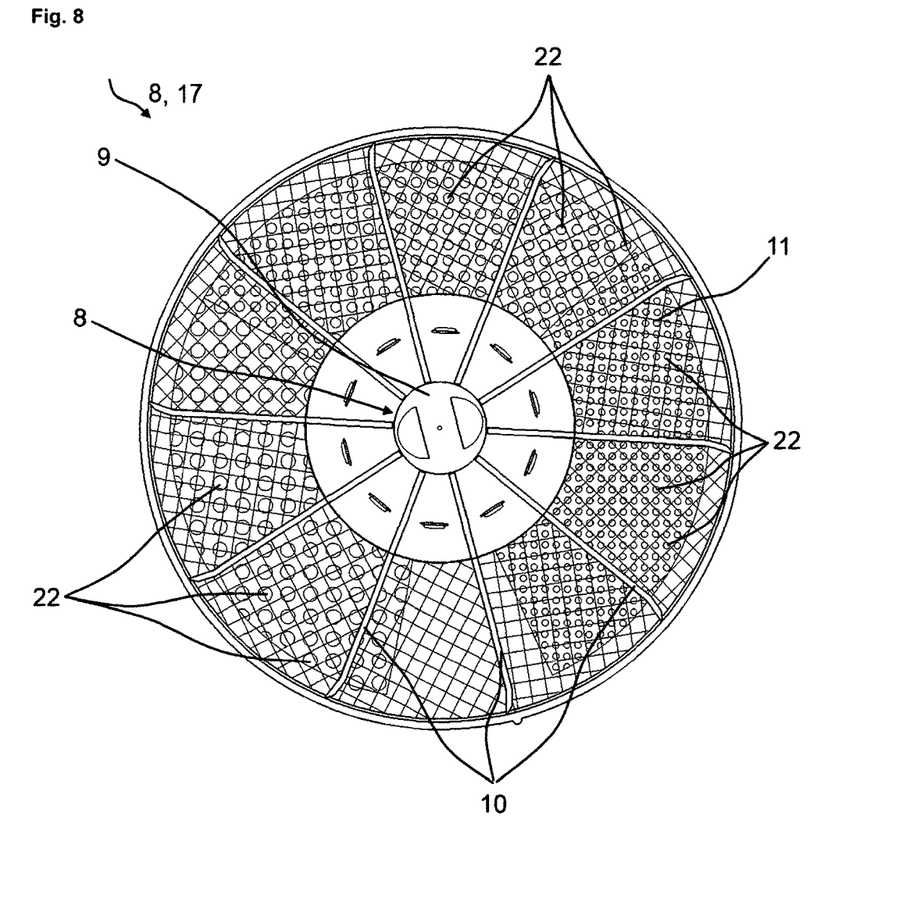
FIG. 8 shows a top view onto the assembly illustrated in FIG. 7

FIG. 3 shows a cut, perspective illustration of the fluidizing apparatus 1 according to the invention. In addition to the technical features illustrated in FIGS. 1 and 2 described above, the flow receiving base 11 of the rotary dryer star 8 is shown in FIG. 3 in a clearly visible manner in the assembled state of the two functional units, distribution chamber 2 and turbulence chamber 3. The flow receiving base 11, which can be replaced and which is arranged so as to be capable of being rotated jointly on the rotary dryer star 8, has an opening ratio, which is constant across its surface. Said opening ratio is illustrated in FIGS. 7 and 8 as uniform structure. The opening ratio of the flow receiving base 11 can be adapted to the solid particles, which are to be conditioned, and, in the event of a flow receiving base 11, which rotates jointly, for example a grate or the like, is a function of the smallest occurring size of the solid particles, which are to be conditioned. This adaptation of the flow receiving base 11 to the smallest solid particles, which are to be conditioned, counteracts a product loss during the dwell time of the solid particles in the turbulence chamber 3, because said solid particles cannot fall through the flow receiving base 11, even in the case of a non-embodied fluidized fluid bed. The flow receiving base 11 furthermore also forms a processing chamber closure and thus defines the functional unit of the turbulence chamber 3 relative to the functional unit of the distribution chamber 2.

Figure 4:
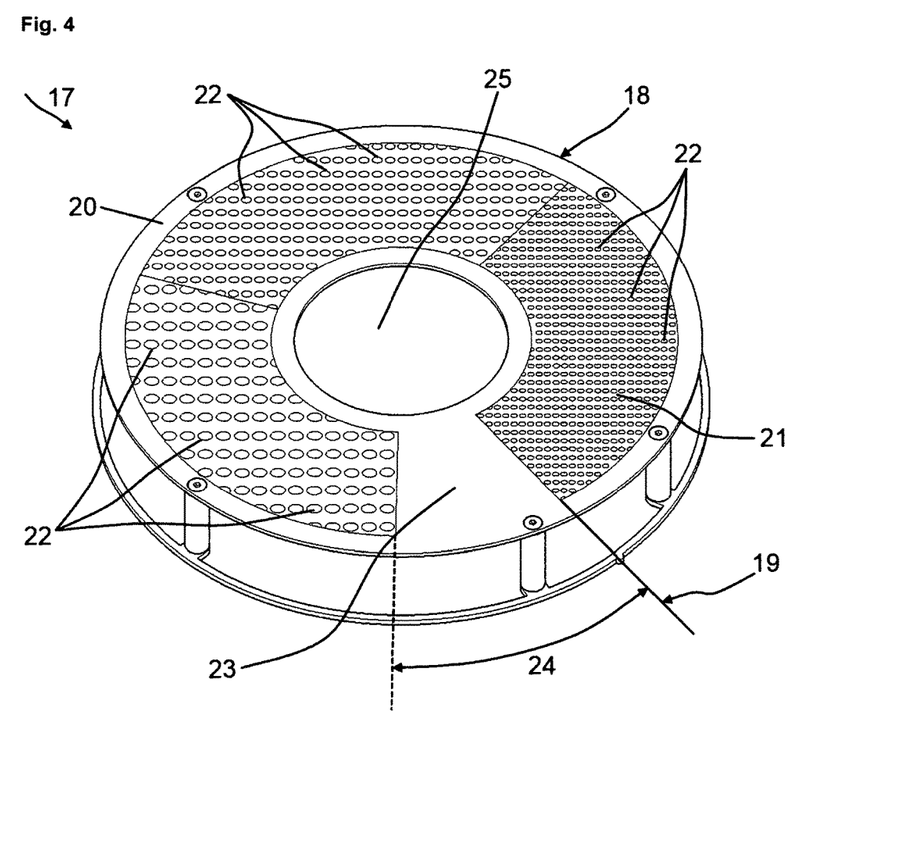
FIG. 4 shows a perspective illustration of a mounting part of the distribution chamber.

FIG. 4 shows a perspective illustration of a mounting part 17, which is integrated into the distribution chamber 2 of the fluidizing apparatus 1. The mounting part 17 consists of an air distribution plate 18, which is arranged on a frame 19 so as to be capable of being replaced in a possible embodiment. The air distribution plate 18 can be embodied in one or in several pieces. In the exemplary embodiment, the air distribution plate 18 consists of a frame part 20 and of a perforated insert 21. The perforation of the insert 21 can be embodied in any design, for example by means of openings 22 or the like. In the exemplary embodiment, the openings 22 are embodied as opening holes and have different diameters, which become smaller in three stages or segments, respectively, in clockwise direction, starting at a non-perforated sector 23. The opening ratio of the air distribution plate 18 changes with the increasing conveyor path of the solid particles, which are to be conditioned, in the turbulence chamber 3. The openings 22 in the area of the solid particle outlet unit 7 can additionally be embodied in such a manner, for example, that they serve as active blow-out device for the conditioned solid particles, that is, they can be used as blowers for discharging the solid particles. In addition, it is possible to secure the emptying of a processing chamber 12 of the turbulence chamber 3 in a different manner, e.g. by means of suction via low pressure out of the turbulence chamber 3 via the solid particle outlet unit 7. A further possibility is that the two discharge devices are used for solid particles, which have already been conditioned, in combination. In the embodiment, as mentioned above in the description, the frame part 20 of the air distribution plate 18 has a non-perforated sector 23, which has an opening angle 24. The opening angle 24 of the sector 23 as well as the opening angle 14 of the processing chambers 12 is a function of the positions of the solid particle inlet unit 6 and of the solid particle outlet unit 7. Centered in the air distribution plate 18, provision is made for an opening 25, via which the connection to the drive unit 13 of the rotary dryer star 8 is established. However, the drive unit 13 can also be connected to the rotary dryer star 8 in a different manner, so as to drive the latter.

Figure 5:
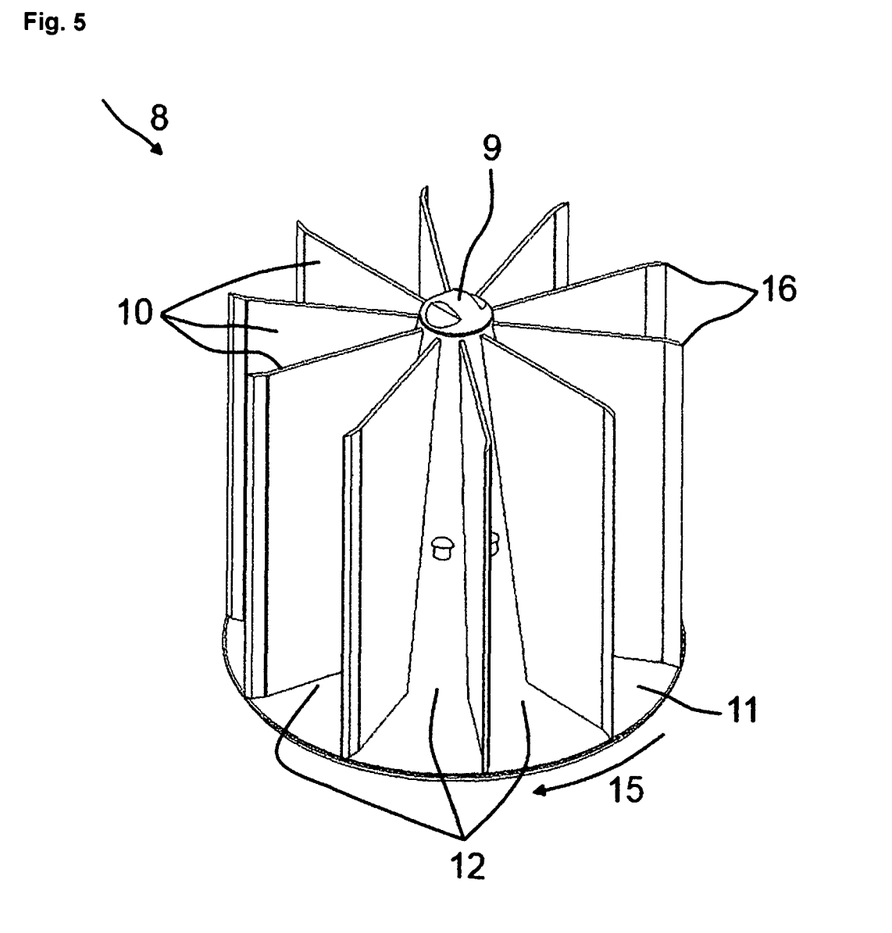
FIG. 5 shows a perspective view of a rotary dryer star.

FIG. 5 shows a perspective view of the rotary dryer star 8. It consists of the cone 9, the separating walls 10 comprising separating wall closures 16, which are curved in the direction of rotation 15, and the flow receiving base 11, which is arranged in a releasable or fixed manner. The processing chambers 12, in which the solid particles are transported through the turbulence chamber 3 with an exactly defined dwell time, are created hereby.

Figure 6:
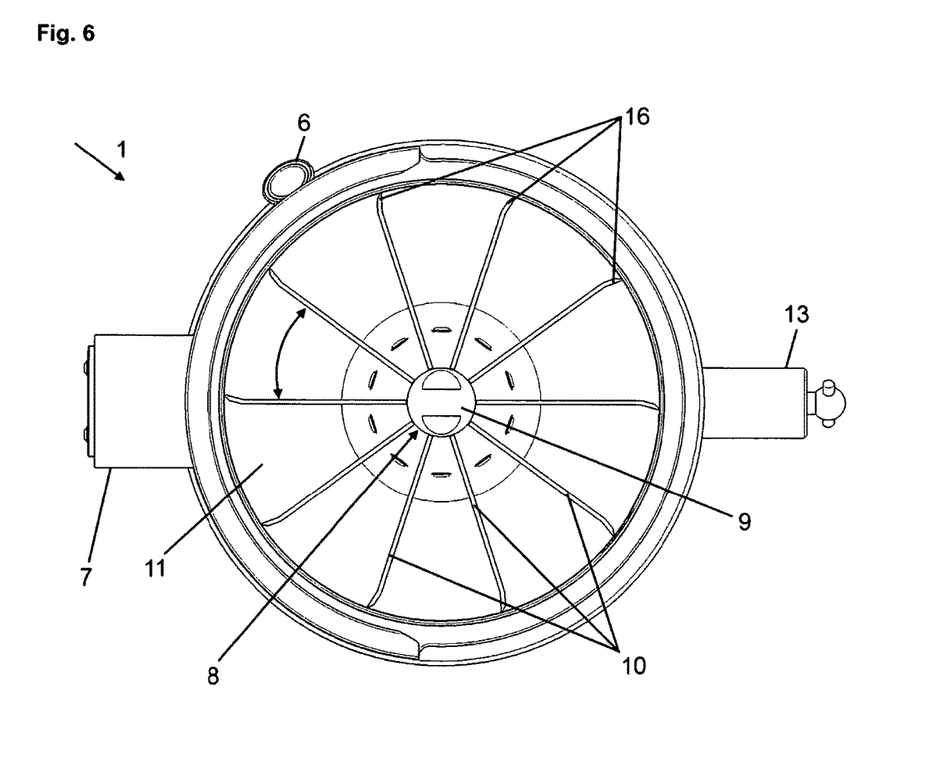
FIG. 6 shows a top view onto a rotary dryer star.

FIG. 6 shows a top view onto the fluidizing apparatus 1 according to the invention. The shown rotary dryer star 8 has the technical features described in FIG. 5 and furthermore shows the opening angle 14, which stretches the processing chambers 12. In the exemplary embodiment, all of the processing chambers 12 have the same opening angle 14, whereby all of the processing chambers 12 have the same size. However, the processing chambers 12 can also have a different opening angle 14 and the sizes thereof are thus no longer identical.

FIG. 7 describes a perspective illustration of the assembly of the rotary dryer star 8, comprising cone 9 and separating walls 10, as well as the mounting part 17 of the distribution chamber 2, consisting of frame 19 and air distribution plate 18. The mounting part 17 is arranged in the distribution chamber 2 below the rotary dryer star 8, which is positioned in the turbulence chamber 3. The uniform opening ratios of the flow receiving base 11, for example of a grate, a punched or perforated plate or the like, as well as the different opening ratios of the air distribution plate 18 are well visible in FIG. 7. The uniform opening ratios are designed for the smallest expansion of the solid particles in the conditioning process, which is to be carried out, and thus prevent a production loss. The different opening ratios of the air distribution plate 18 always ensure optimal flow ratios of the solid particles, which are to be conditioned, during the dwell time in the processing chambers 12 of the turbulence chamber 3, without an extensive and cost-intensive segmenting of the distribution chamber 2.

FIG. 8 shows a top view of the assembly of the rotary dryer star 8 and of the mounting part 17 illustrated in FIG. 7. Compared to FIG. 7, FIG. 8 illustrates the different opening ratios of the air distribution plate 18, which is positioned below the flow receiving base 11, which result from the different diameters of the openings 22 in the exemplary embodiment.

Figure 9:
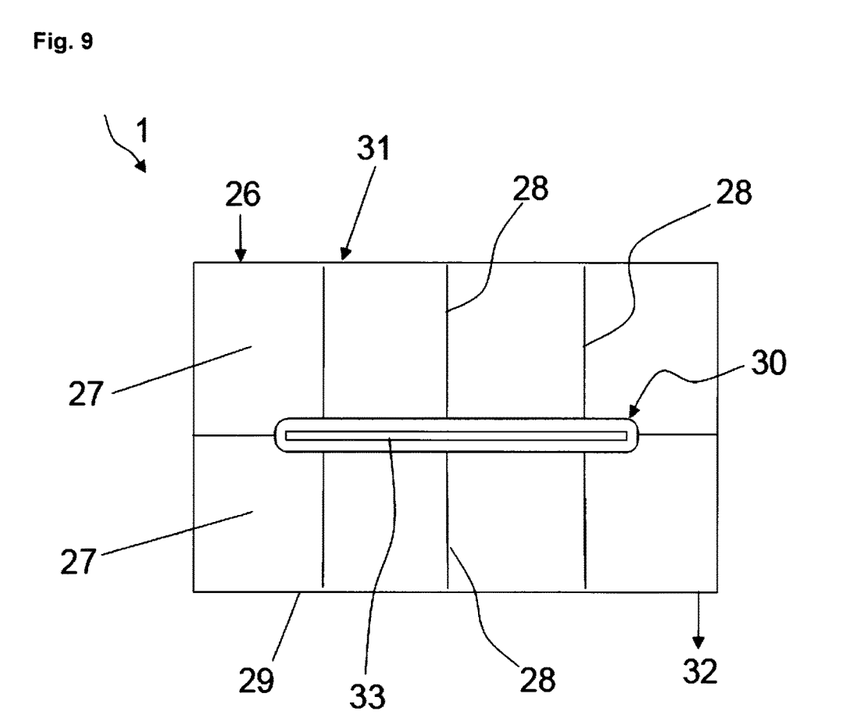
FIG. 9 shows a section through a continuously operated axial fluidized bed dryer.

A further fluidizing apparatus 1 according to the invention is also possible, which, in contrast to the first embodiment, however, does not have a circular, but an axial conveyor path and which is illustrated schematically in FIG. 9. The fluidizing apparatus 1 is loaded with solid particles by means of a solid particle inlet unit 26. The solid particles are transported to the solid particle outlet unit 32 in individual processing chambers 27, which are formed by separating walls 28, an outer jacket 29 and a flow receiving base 30 in the turbulence chamber 31. It is ensured through this that all of the solid particles have the same dwell time in the fluidizing apparatus 1. The air distribution plate 33, which can have the same characteristics as described above, it at least partially arranged below the flow receiving base 30, which is driven by means of the drive unit.

All of the features illustrated herein can be significant for the invention, both alone as well as in any combination with one another.

LIST OF REFERENCE NUMERALS

1 fluidizing apparatus
2 distribution chamber
3 turbulence chamber
4 feed line
5 outer jacket
6 solid particle inlet unit
7 solid particle outlet unit
8 rotary dryer star
9 cone
10 separating wall
11 flow receiving base
12 processing chamber
13 drive unit
14 opening angle
15 direction of rotation
16 separating wall closure (seal)
17 mounting part
18 air distribution plate
19 frame
20 frame part
21 perforated insert
22 opening
23 non-perforated sector
24 opening angle
25 opening
26 solid particle inlet unit
27 processing chamber
28 separating wall
29 outer jacket
30 flow receiving base
31 turbulence chamber
32 solid particle outlet unit
33 air distribution plate

The invention claimed is:

1. A fluidizing apparatus for continuously conditioning solid particles, the fluidizing apparatus comprising:
    a distribution chamber,
    a turbulence chamber, wherein the turbulence chamber has separating walls for conveying solid particles along a conveyor path,
    a solid particle inlet unit,
    a solid particle outlet unit,
    a flow receiving base, and
    an air distribution plate arranged below the flow receiving base,
    wherein opening ratios, resulting through openings in the air distribution plate, change with an increasing conveyor path of the solid particles to be conditioned in the turbulence chamber to always ensure optimal flow ratios of the solid particles to be conditioned during dwell time in processing chambers of the turbulence chamber, and
    wherein the separating walls are configured to rotate while an outer wall of the turbulence chamber remains stationary, and
    wherein each separating wall of the separating walls has an outer end and a separating wall closure at the outer end, the separating wall closure being curved or angled such that the separating wall closure scrapes off an inner surface of the outer wall of the turbulence chamber as the separating walls rotate and the outer wall remains stationary.

2. The fluidizing apparatus according to claim 1, wherein a variation of the opening ratios takes place on the air distribution plate as a function of the cross section of the openings.

3. The fluidizing apparatus according to claim 1, wherein at least one processing chamber is located between the solid particle inlet unit and the solid particle outlet unit of the fluidizing apparatus, so that a backmixing with the solid particles, which have already been conditioned, does not take place when adding solid particles.

4. The fluidizing apparatus according to claim 1, wherein at least one non-perforated sector is arranged on the air distribution plate.

5. The fluidizing apparatus according to claim 4, wherein the non-perforated sector has an opening angle.

6. The fluidizing apparatus according to claim 1, wherein a rotary dryer star is arranged in a rotatable manner in the turbulence chamber.

7. The fluidizing apparatus according to claim 6, wherein the rotary dryer star comprises the separating walls, and
    wherein a respective processing chamber is formed between each two adjacent walls of the separating walls of the rotary dryer star.

8. The fluidizing apparatus according to claim 7, wherein the processing chambers have identical dimensions.

9. The fluidizing apparatus according to claim 1, wherein the openings of the air distribution plate take over the function of a blower device in the area of the solid particle outlet unit for discharging the solid particles.

10. The fluidizing apparatus according to claim 1, wherein the air distribution plate can be replaced.

11. The fluidizing apparatus according to claim 7, wherein the separating walls arranged on the rotary dryer star extend across the entire height of the turbulence chamber.

12. The fluidizing apparatus according to claim 1, wherein with respect to a height of the turbulence chamber the solid particle inlet unit is disposed in a mid-region of the turbulence chamber.

13. A fluidizing apparatus for continuously conditioning solid particles, the fluidizing apparatus comprising:
- a distribution chamber,
- a turbulence chamber, wherein the turbulence chamber has separating walls for conveying solid particles along a conveyor path,
- a solid particle inlet unit,
- a solid particle outlet unit,
- a flow receiving base, and
- an air distribution plate arranged below the flow receiving base,
- wherein opening ratios, resulting through openings in the air distribution plate, change with an increasing conveyor path of the solid particles to be conditioned in the turbulence chamber to always ensure optimal flow ratios of the solid particles to be conditioned during dwell time in processing chambers of the turbulence chamber, and
- wherein the separating walls are configured to rotate while an outer wall of the turbulence chamber remains stationary
- wherein the conveyor path extends in a circumferential direction in the turbulence chamber,
- wherein the air distribution plate comprises a plurality of segments following one another in the circumferential direction, and
- wherein the cross section of the openings increase from one segment of the plurality segments to an adjacent segment of the plurality of segments along the conveyor path.

\* \* \* \* \*